United States Patent [19]

Nagaura

[11] Patent Number: 5,478,675
[45] Date of Patent: Dec. 26, 1995

[54] SECONDARY BATTERY

[75] Inventor: Toru Nagaura, Fukuoka, Japan

[73] Assignee: Hival Ltd., Fukuoka, Japan

[21] Appl. No.: 358,491

[22] Filed: Dec. 19, 1994

[30] Foreign Application Priority Data

Dec. 27, 1993 [JP] Japan .................................. 5-355054

[51] Int. Cl.$^6$ .................................................. H01M 4/52
[52] U.S. Cl. ............................................................ 429/224
[58] Field of Search ............................................. 429/224

[56] References Cited

U.S. PATENT DOCUMENTS 5,053,297  10/1991  Yamahira et al. ....................... 424/194
5,316,875  5/1994  Murai et al. ............................. 429/194

OTHER PUBLICATIONS

Japanese kokai:, 05–13107, Jan. 22, 1993, Ozawa et al Lithium Secondary Battery (abstract).

Primary Examiner—Stephen Kalafut
Assistant Examiner—Richard H. Lilley, Jr.
Attorney, Agent, or Firm—Nikaido Marmelstein Murray & Oram

[57] ABSTRACT

A nonaqueous electrolyte secondary battery comprising a cathode, an anode, a separator and a nonaqueous electrolyte, wherein a spinel type lithium manganese complex oxide is used as main active substance for the cathode, which is characterized in that a solid state lithium ion conductor is mixed with the main active substance in the cathode.

3 Claims, 4 Drawing Sheets

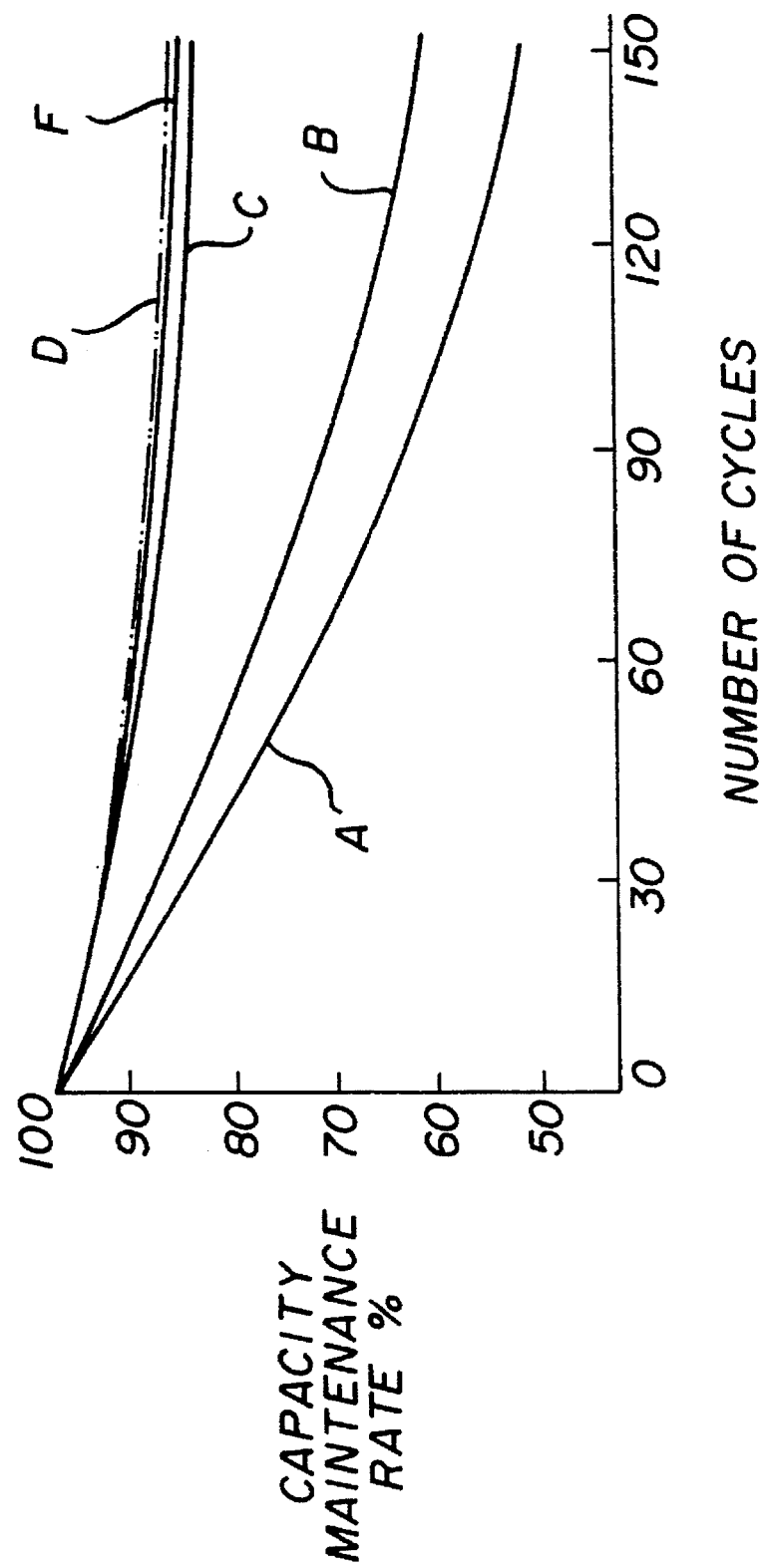

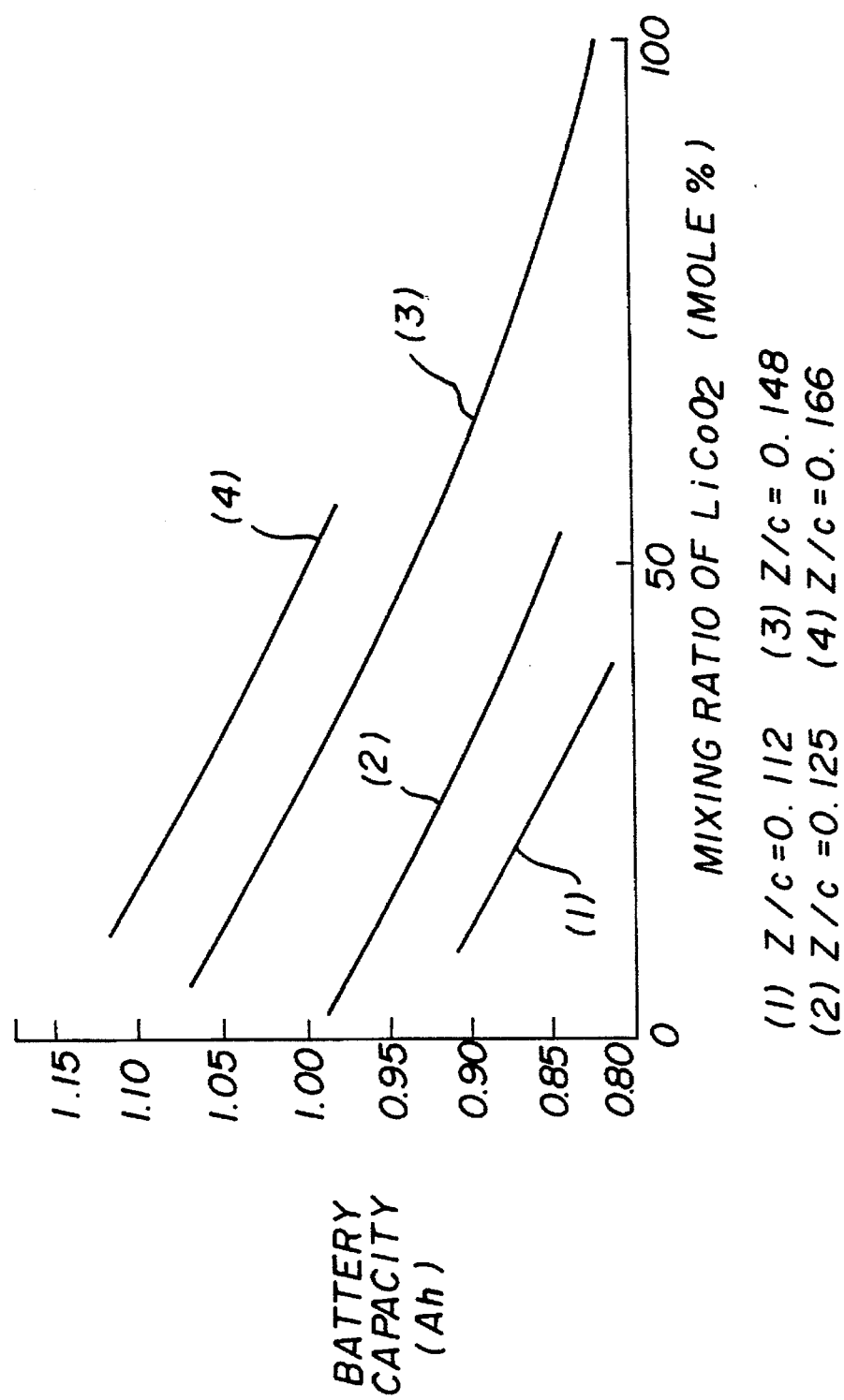

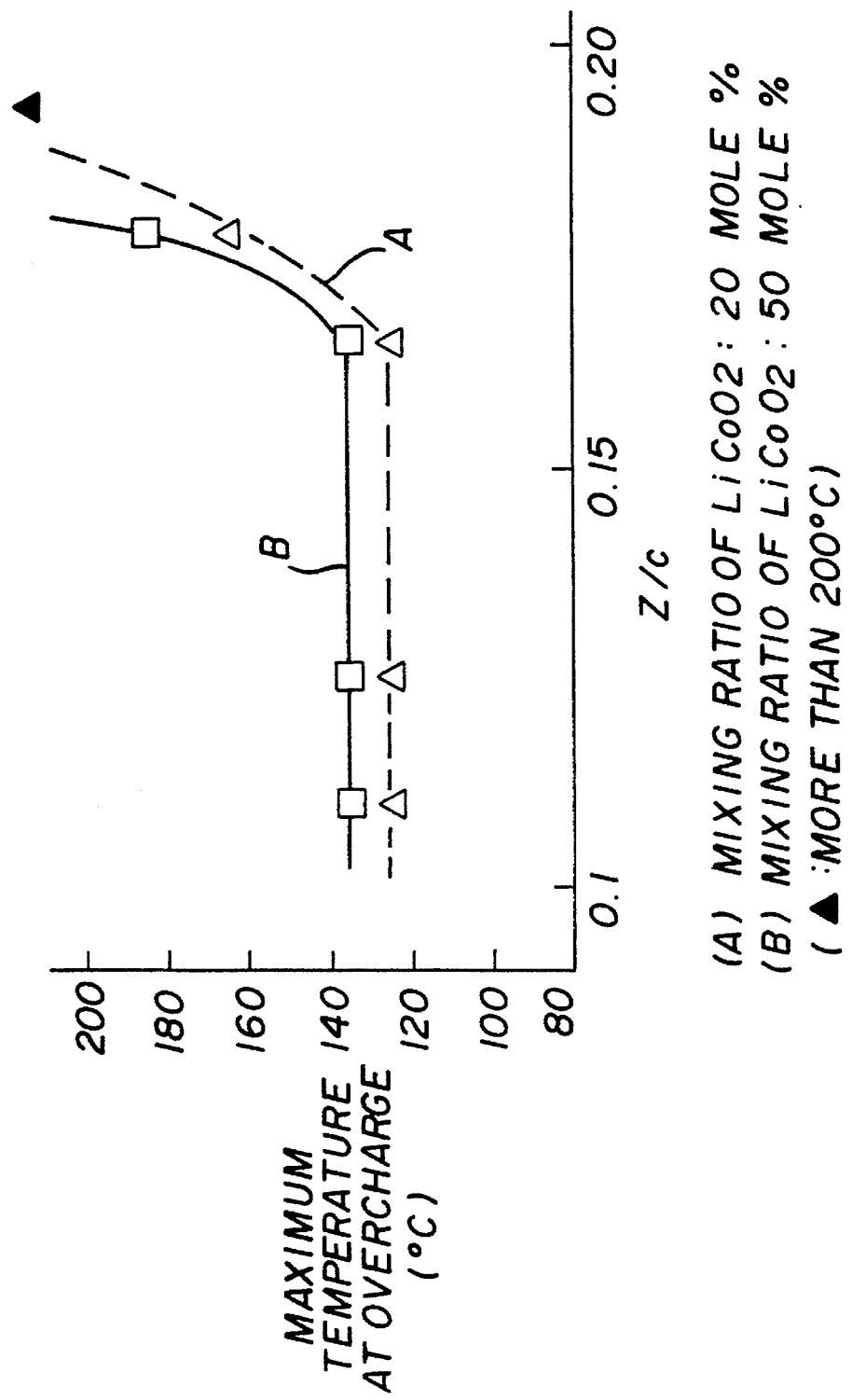

SECONDARY BATTERY

SECONDARY BATTERY

The present invention relates to improvement of performance of nonaqueous electrolyte secondary battery.

In the trend of smaller size and lighter weight of electronic appliances, there is a mounting demand for secondary battery of high energy density as their power supplies. To meet this demand, the nonaqueous electrolyte secondary battery is noticed, and its practical use has been attempted. In particular, the so-called lithium secondary battery using lithium metal in the anode was considered to have the largest possibility, but in the course of repeated charging and discharging, the metal lithium anode is powdered and is extremely deteriorated in its performance, or the metal lithium precipitates in dendrite to induce internal shorting, and it has a problem in its practical cycle life, and it is far from practical at the present.

Recently, hence, it is attempted to develop a nonaqueous electrolyte secondary battery using carbon electrode as the anode by making use of lithium ions coming in and going out of carbon, This battery was introduced for the first time in the world by the present inventors in 1990 in the name of lithium ion secondary battery (see Progress in Batteries & Solar Cells, Vol. 9, 1990, p. 209), and at the present it is widely recognized in the battery industry and in the academic circle as the secondary battery of next generation, "lithium ion secondary battery," and its practical use is accelerated. Typically, a complex oxide containing lithium is used as the cathode, and carbon material such as coke and graphite is used as the anode.

Actually, using $LiCoO_2$ as cathode material and a special carbon material (quasi-graphite material having a certain turbulent layer structure) as the anode, a lithium ion secondary battery having an energy density of about 210 Wh/l is used as the power source for handy telephone or video camera, although in a small quantity.

A major demerit of this battery is the high price of battery. One of the reasons is that an overcharge protective circuit is required. In the existing lithium ion secondary battery, it may be ignited if overcharged, and it is prevented by incorporating an IC chip of overcharge protective circuit in the battery pack. Another major factor of high price of battery is the use of expensive cobalt. Since the resource is limited, lowering of cobalt price is not expected in the future.

In considering an inexpensive lithium ion secondary battery, the lithium manganese complex oxide is an attractive material for the cathode. The lithium manganese complex oxide ($LiMn_2O_4$, etc.) is an inexpensive material, and safety is extremely high against overcharging, and overcharge protective circuit is not required.

When $LiCoO_2$ is used as the cathode active substance in the lithium ion secondary battery, the battery reaction is as follows.

In normal charge-discharge reaction,

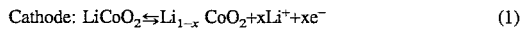

Cathode: $LiCoO_2 \leftrightarrows Li_{1-x}CoO_2 + xLi^+ + xe^-$ (1)

Anode : $xC_6 + xLi^+ + xe^- \leftrightarrows xLiC_6$ (2)

($x \approx 0.6$)
In overcharging,

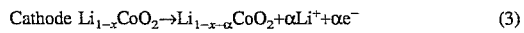

Cathode $Li_{1-x}CoO_2 \rightarrow Li_{1-x-\alpha}CoO_2 + \alpha Li^+ + \alpha e^-$ (3)

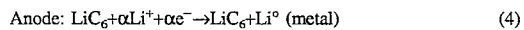

Anode: $LiC_6 + \alpha Li^+ + \alpha e^- \rightarrow LiC_6 + Li^0$ (metal) (4)

In normal charging, about 60% of lithium in the cathode active substance is extracted, and is doped into the carbon in the anode. As a result, the cathode active substance becomes $Li_{1-x}CoO_2$ ($x \approx 0.6$), but when overcharged, the remaining lithium is further extracted, and the lithium extracted in overcharging precipitates on the surface of the anode as metal lithium. This metal lithium precipitating on the anode surface is extremely active, and it violently reacts with electrolyte, possibly causing thermal runaway, and safety in overcharging is uncertain.

On the other hand, when lithium manganese complex oxide ($LiMn_2O_4$, etc.) is used in the cathode, in normal charge-discharge reaction, the following reactions (5) and (6) take place. That is, in normal charging, almost all lithium in the cathode is extracted and doped into the anode carbon, if overcharged, there is no longer any remaining lithium to move from the cathode to the anode. Therefore, if overcharged, metal lithium does not deposit on the anode, and safety in overcharging is guaranteed.

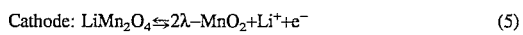

Cathode: $LiMn_2O_4 \leftrightarrows 2\lambda - MnO_2 + Li^+ + e^-$ (5)

Anode: $C_6 + Li^+ + e^- \leftrightarrows LiC_6$ (6)

Regrettably, however, in spite of the major features in price and safety, the lithium ion secondary battery using lithium manganese complex oxide as cathode material is not put in practical use because the deterioration of capacity is significant due to charging and discharging cycles, especially at high temperature (over 35° C.).

It is an object of the invention to provide a lithium ion secondary battery high in safety in overcharge, and excellent in cycle characteristic, by using spinel type lithium manganese complex oxide as a main cathode active substance.

The above and other objects of the invention will become apparent from the following description.

A solid state lithium ion conductor is mixed with a lithium manganese complex oxide which is a main cathode active substance in the cathode. In one practical method, the cathode is prepared by mixing $LiCo_{1-y}Ni_yO_2$ (where $0 \leq y \leq 1$) by 5 mole % or more and 50 mole % or less, and the molar number (a) of Mn and the sum (b) molar number of Co and Ni contained in the cathode active substance layer, and the molar number (c) of active substance carbon contained in the anode active substance layer confronting the cathode are defined in the relation of $0.12 \leq (a+2b)/2c \leq 0.17$.

The lithium ion secondary battery using a complex oxide expressed in a general formula $LiCo_{1-y}Ni_yO_2$ (where $0 \leq y \leq 1$) typically represented by $LiCoO_2$ as cathode active substance exhibits an excellent charge-discharge cycle characteristics. In this case, in normal charging (charging voltage 4.2 V), about 60% of lithium is extracted from the cathode active substance, and at the end of charging, 40% of lithium is left over in the cathode active substance. Therefore, by the sufficient residual lithium in the active substance, the ion conductivity of the active substance is maintained favorably, and capacity deterioration due to charging and discharging cycles seems to be small. However, as mentioned above, the residual lithium in the cathode active substance causes precipitation of metal lithium on the anode in overcharging, and safety in overcharging is sacrificed.

On the other hand, in the lithium ion secondary battery using spinel type lithium manganese complex oxide (typically represented by $LiMn_2O_4$) as the cathode active substance, in normal charging reaction (charging voltage 4.2 V), almost all lithium in the cathode is extracted. This is the reason why it is safe in overcharging, but, on the other hand, it is considered as a cause of capacity deterioration accompanying charging and discharging cycles.

At the end of charging, residual lithium is very little in the cathode active substance, and ion conduction which should be realized by move of lithium ions within the active substance crystal is spoiled, and active substance unable to react gradually increases, which is regarded as cause of capacity deterioration.

For efficient progress of charging and discharging reaction of the electrode active substances, favorable electron conduction and ion conduction must be maintained on all active substances. Application of electron conduction to active substance has been conventionally done by mixing of conductive agent such as graphite and acetylene black, but application of ion conduction to active substance has not been experienced in the past.

In the invention, by containing a material having lithium ion conductivity in the cathode, lithium ion conductivity is afforded to the active substance losing the conductivity of lithium ions due to lack of residual lithium at the terminal end of charging, thereby notably improving the cycle characteristic of the lithium ion secondary battery using spinel type lithium manganese complex oxide as cathode active substance.

It is known that $Li_xCo_{1-y}Ni_yO_2$ (where $0<x<1$, $0 \leq y \leq 1$) subtracting a certain amount of Li from $LiCo_{1-y}Ni_yO_2$ is a favorable lithium ion conductor. Therefore, by containing $Li_xCo_{1-y}Ni_yO_2$ (where $0<x<1$, $0 \leq y \leq 1$) in the cathode as ion conduction aid, the invention can be conducted as one embodiment thereof.

In actual battery preparation, the cathode is fabricated by mixing 5 mole % or more of $LiCo_{1-y}Ni_yO_2$ (where $0 \leq y \leq 1$) in the lithium manganese complex oxide as main active substance. The added $LiCo_{1-y}Ni_yO_2$ functions also as the active substance, and lithium ions are partly extracted, and in the cathode it exists in a form of $Li_xCo_{1-y}Ni_yO_2$ (where $0<x<1$, $0 \leq y \leq 1$), and therefore it functions effectively as ion conduction aid, so that the charging and discharging efficiency of the main active substance may be favorably continued.

However, mixing of $LiCo_{1-y}Ni_yO_2$ basically causes to increase the cathode material cost, and the residual lithium in $Li_xCo_{1-y}Ni_yO_2$ causes to precipitate metal lithium on the anode in overcharging, and the safety in overcharging may be spoiled, and therefore in the invention, the content of $Li_xCo_{1-y}Ni_yO_2$ is defined at 5 mole % or more and 50 mole % or less of the cathode main active substance, preferably 30 mole % or less, or more preferably 20 mole % or less. Furthermore, the safety in overcharging is guaranteed when the molar number (a) of Mn and the sum (b) of molar number of Co and Ni contained in the cathode active substance layer, and the molar number (c) of active substance carbon contained in the anode active substance layer confronting the cathode satisfy the relation of $$0.12 \leq (a+2b)/2c \leq 0.17$$

In the above formula, (a+2b)/2 is equal to the amount of lithium (Z) originally contained in the cathode active substance layer confronting the anode before initial charge.

The inventors comparatively studied the battery characteristic by varying the mixing ratio of lithium manganese complex oxide and $LiCo_{1-y}Ni_yO_2$ and the value of Z/c, and found the specified range in which all of battery capacity, safety in overcharging, and charging and discharging cycle performance are sufficiently guaranteed, and thereby accomplished the present invention.

In the present invention, as an anode is used those which are known in the art. For example, is used an anode which employs as an anode active substance lithium metal, lithium alloy, sulfide of a transition metal ($TiS_2$, $NbS_2$, $VS_2$, etc.), $Li_{1+z}Ti_{2-z}O_4$ (where $0 \leq z \leq 1/3$), $Nb_2O_5$ or the like. Especially preferable is an anode which employs as an anode active substance a carbon material capable of doping and dedoping lithium. Examples of useful carbon materials are pitch coke, petroleum coke, graphite, mesocarbon micro beads or the like.

As a separator is used a nonwoven fabric or micro porous film which is stable to an electrolyte. Examples of useful separators are micro porous film made of polypropylene or polyethylene.

Nonaqueous electrolyte includes those known in the art. Examples of useful nonaqueous electrolytes are nonaqueous solvents dissolved lithium salt therein. Examples of useful nonaqueous solvents are propylene carbonate, ethylene carbonate, γ-butyrolactone, dimethoxyethane, diethoxyethane, diethyl ether, tetrahydrofuran, dioxolan, sulfolane, methylsulfolane or the like. Lithium salts include $LiAsF_6$, $LiPF_6$, $LIEF_4$, $LiClO_4$, $LiCF_3CO_2$, $LiCF_3SO_3$, or the like. These nonaqueous solvent and lithium salt are used singly or in a mixture of at least two of them, respectively.

The invention is described in more detail below by referring to examples.

FIG. 2 is a diagram showing cycle characteristic of secondary battery.

FIG. 3 is a relation diagram of $LiCoO_2$ mixing ratio in cathode and battery capacity.

FIG. 4 shows temperature rise due to overcharging in battery.

Figure 1:
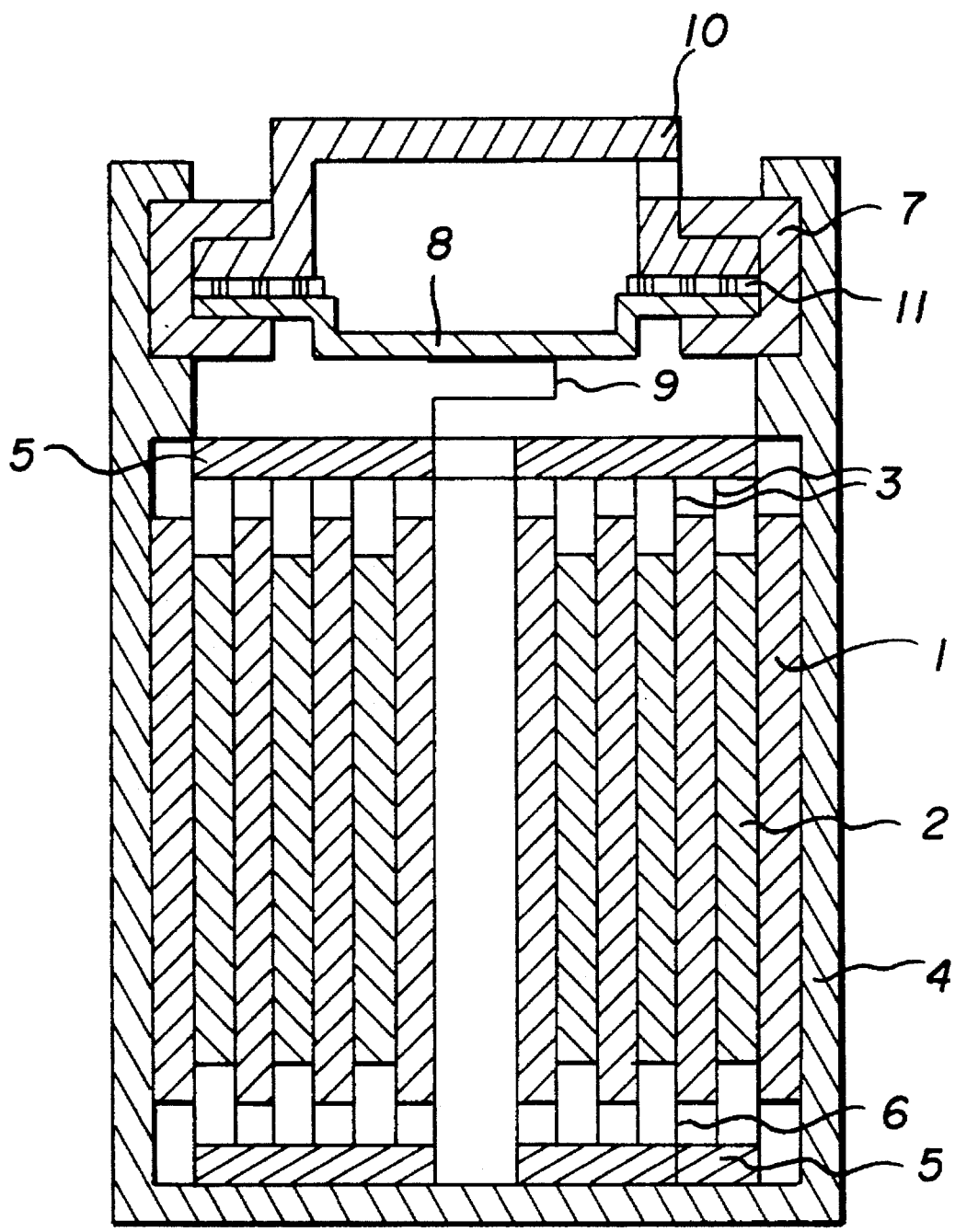
FIG. 1 is a schematic sectional view showing the structure of a battery in an example.

Reference numeral 1 is an anode, 2 a cathode, 3 a separator, 4 a battery can, 5 an insulator, 6 an anode lead, 7 a gasket, 8 an anti-explosive valve, 9 a cathode lead, and 10 a closing lid.

EXAMPLE 1

Referring first to FIG. 1 through FIG. 4, a cylindrical battery of the invention is explained. FIG. 1 shows an entire structure of the battery of this embodiment. The battery element which is a power generating element for realizing the invention was prepared in the following procedure.

To 86 parts by weight of mesocarbon micro beads ($d_{002}$= 3.37Å, product of Osaka Gas Co., Ltd.) heated at 2800° C. were added 4 parts by weight of acetylene black, and 10 parts by weight of polyvinylidene fluoride (PVDF) as binder, and the mixture was further mixed in wet process with a solvent, N-methyl-2-pyrrolidone, and an anode paste was obtained. This anode paste was uniformly applied on both sides of a copper foil of 0.01 mm in thickness as an anode current collector at various amounts, and, after drying, it was pressed and formed by a roller press, and band-shaped anodes (1) were prepared at various active substance carbon contents.

In succession, the cathode was prepared as follows. Commercial manganese dioxide ($MnO_2$) and lithium carbonate ($Li_2CO_3$) were mixed at Li and Mn atomic ratio of 1:2, and the mixture was baked for 20 hours in air at 750° C., and $LiMn_2O_4$ was prepared.

Next, commercial lithium carbonate ($Li_2CO_3$) and cobalt carbonate ($CoCO_3$) were mixed at Li and Co atomic ratio of 1:1, and was baked for about 5 hours in air at 850° C., and $LiCoO_2$ was prepared.

Thus prepared $LiMn_2O_4$ and $LiCoO_2$ were mixed at various molar ratios as shown in Table 1, and to 87 parts by weight of the mixture were added 2 parts by weight of acetylene black and 8 parts by weight of graphite and mixed thoroughly, and further 3 parts by weight of polyvinylidene fluoride as binder and N-methyl-2-pyrrolidone as solvent were added and mixed in wet process, and cathode pastes at different mixing ratios of $LiCoO_2$ in $LiMn_2O_4$ were prepared. The cathode paste was applied uniformly on both sides of an aluminum foil of 0.02 mm in thickness as a cathode current collector at various amounts, and, after drying, it was pressed and formed by a roller press, and band-shaped cathodes (2) were prepared at various active substance contents.

Thus prepared anode (1) and cathode (2) were taken up in a roll form with a porous polypropylene separator (3) placed between them, and a battery element was prepared as a roll with mean outside diameter of 15.7 mm.

An insulator (5) was put in the bottom of a nickel plated iron battery can (4), and the above battery element was accommodated. An anode lead (6) taken out from the battery element was welded to the bottom of the battery can, and a mixed solution of ethylene carbonate (EC) and diethyl carbonate (DEC) dissolving 1 mole/liter of $LiPF_6$ was poured into the battery can as electrolyte. An insulator (5) was also put on the top of the battery element, a gasket (7) was fitted, and an anti-explosive valve (8) was installed in the battery as shown in FIG. 1. A cathode lead (9) taken out from the battery element was welded to this anti-explosive valve before electrolyte pouring. On the anti-explosive valve, a closing lid (10) as cathode external terminal was laid over through an intervening doughnut shaped PTC switch (11), and the brim of the battery can was crimped, and a total of 15 types of battery, battery (A) to battery (O), were prepared in the outside diameter of 16.5 mm and height of 65 mm in the battery structure as shown in FIG. 1. The design values of these 15 batteries are as shown in Table 1.

The prepared batteries were aged at ordinary temperature for 12 hours for the purpose of stability of the battery inside, and the charging upper limit voltage was set at 4.2 V, and by charging at ordinary temperature for 8 hours and discharging at constant current of 800 mA at ordinary temperature in all batteries until the terminal voltage of 3.0 V, and the initial discharge capacity of each battery was determined.

The initial discharge capacity is shown in Table 2.

TABLE 1

| Battery | A | B | C | D | E | F | G |
|---|---|---|---|---|---|---|---|
| Mole % of $LiCoO_2$ in cathode | 0 | 3.0 | 5.0 | 100 | 10 | 20 | 50 |
| Z/c | | | 0.148 | | | 0.125 | |

| Battery | H | I | J | K | L | M | N | O |
|---|---|---|---|---|---|---|---|---|
| Mole % of $LiCoO_2$ in cathode | 10 | 20 | 50 | 20 | 50 | 20 | 50 | 20 |
| Z/c | | 0.112 | | | 0.166 | | 0.179 | 0.19 |

Z: Lithium content originally contained in cathode active substance layer confronting the anode c: Molar number of active substance carbon contained in anode active substance layer confronting the cathode.

TABLE 2

| Battery | A | B | C | D | E | F | G |
|---|---|---|---|---|---|---|---|
| Initial discharge capacity (Ah) | 1.0 | 1.08 | 1.07 | 0.82 | 0.97 | 0.94 | 0.85 |

| Battery | H | I | J | K | L | M | N | O |
|---|---|---|---|---|---|---|---|---|
| Initial discharge capacity (Ah) | 0.91 | 0.88 | 0.79 | 1.09 | 1.00 | 1.13 | 1.04 | 1.13 |

Afterwards, each battery was presented for charging and discharging cycle test at 40° C. The charging current was 400 mA, and the charging upper limit voltage was set at 4.2 V, and charging and discharging were repeated by charging for 4 hours and discharging at constant current of 800 mA until the terminal voltage of 3.0 V.

The cycle characteristic is shown in FIG. 2, in which the battery (D) using $LiCoO_2$ by 100% maintained a high capacity maintenance rate exceeding 85% after 150 cycles, while the battery (A) without $LiCoO_2$ dropped in capacity significantly along with cycles, becoming nearly half of the initial capacity in about 150 cycles. On the other hand, in the battery containing 5% or more of $LiCoO_2$, the capacity maintenance rate was improved nearly to the same level as the battery (D) with 100% $LiCoO_2$. However, mixing of $LiCoO_2$ by 3 mole % was insufficient, and it is known necessary to mix $LiCoO_2$ by 5% or more at least in order to improve the capacity maintenance rate.

Furthermore, on the basis of the results in Table 2, analysing the relation between the initial discharge capacity of each battery and mixing ratio of $LiCoO_2$ into each battery, as shown in FIG. 3, when Z/c is constant, the capacity decreases as the mixing ratio of $LiCoO_2$ increases. Moreover, one of the major features of the lithium ion secondary battery using lithium manganese complex oxide ($LiMn_2O_4$) as cathode material lies in the inexpensive material, and the addition of the expensive $LiCoO_2$ should be 50% or less, preferably 30% or less, or more preferably 20% or less.

Meanwhile, when Z/c is 0.112 (batteries H, I, J), the initial capacity is small, and hence $0.12 \leq Z/c$ should be required.

Another important feature of the lithium ion secondary battery using lithium manganese complex oxide ($LiMn_2O_4$) as cathode material lies in safety in overcharging.

In the trial batteries, safety in overcharging was evaluated as follows.

First, as normal charging, the charging current was set at 400 mA and the charging upper limit voltage was 4.2 V, and charging was performed for 4 hours. In succession, the charging upper limit voltage was set at 10 V, and the charging current was raised to 1.6 A, and overcharging was conducted for 1 hour, and the maximum reached temperature of the battery surface was measured, and the result is shown in FIG. 4.

In the battery with Z/c of 0.17 or less, 120° C. was nearly the maximum reached temperature, and at Z/c=0.179, it was raised over 160° C., and in the battery with Z/c=0.19, finally, the inside of the battery was fired and the temperature exceeded 300° C.

Previously, from the viewpoint of battery capacity, $0.12 \leq Z/c$ was defined, but it should be modified to $Z/c \leq 1.7$ from the viewpoint of safety in overcharging.

The value of Z used herein is the content of lithium (Z) initially contained in the cathode active substance layer confronting the anode before initial charge, and in relation to the amount of transition elements in the cathode active substance (Mn and Co in this example), it is $$Z = (a + 2b)/2$$

wherein a, b are molar numbers of Mn and Co in the cathode, respectively, and since (a+2b)/2 is invariable in any state of charging and discharging, and therefore, for the sake of convenience, the optimum design value capable of guaranteeing the safety in overcharging may be expressed as follows.

$$0.12 \leq (a+2b)/2c \leq 0.17$$

EXAMPLE 2

Commercial lithium carbonate ($Li_2CO_3$), cobalt carbonate ($CoCO_3$) and nickel carbonate ($NiCO_3$) were mixed at an atomic ratio of Li, Co and Ni of 1:0.5:0.5, and baked for about 5 hours in air at 850° C., and lithium cobalt nickel complex oxide ($LiCo_{0\times5}Ni_{0\times5}O_2$) was prepared.

The prepared $LiCo_{0\times5}Ni_{0\times5}O_2$ was mixed in $LiMn_2O_4$ prepared in Example I at the molar ratio shown in Table 3, and the mixture was used as the cathode active substance, and batteries (P), (Q), (R) were prepared in the same procedure in Example 1, and were evaluated in the same manner as in Example 1, of which results are shown in Table 3.

TABLE 3

| Battery | P | Q | R |
| --- | --- | --- | --- |
| Mole % of $LiCo_{0.5}Ni_{0.5}O_2$ in cathode | 20 | 20 | 3.0 |
| Z/c | 0.14 | 0.19 | 0.14 |
| Initial capacity (mAh) | 1000 | 1162 | 1057 |
| Safety in overcharge (maximum reached temperature) | 120° C. | Fire | 120° C. |
| Capacity maintenance rate (%) in 100 cycles | 91 | — | 75 |

In Example 2, instead of $LiCoO_2$ in Example 1, $LiCo_{0\times5}Ni_{0\times5}O_2$ was used, and the battery (P) was prepared at optimum design values found in Example 1, the battery (Q) had a design value of Z/c=0.19, out of the optimum range, and the battery (R) was prepared in the insufficient range of the content of $LiCo_{0\times5}Ni_{0\times5}O_2$.

As a result, as shown in Table 3, the battery (P) presented satisfactory results predicted from Example 1 in all of capacity, safety in overcharging and cycle characteristic, while the battery (Q) was insufficient in safety in overcharging, and the battery (R) had a large deterioration of capacity in cycle characteristic, and similar results were obtained when $LiCo_{0\times5}Ni_{0\times5}O_2$ was used instead of $LiCoO_2$. Therefore, in the lithium ion secondary battery using lithium manganese complex oxide as cathode active substance, it is evident that mixture of $Li_xCo_{1-y}Ni_yO_2$ (where $0 < x < 1$, $0 \leq y \leq 1$) known as a favorable ion conductor of lithium ions in the cathode as ion conduction aid is effective for improving the cycle characteristic.

In the cycle characteristic improving method of affording ion conduction to the spinel type lithium manganese complex oxide, it is also possible to use other lithium ion conductor as ion conduction aid.

EXAMPLE 3

In this example, as an anode active substance was used a spinel type lithium titanium oxide having a formula $Li_{1+z}Ti_{2-z}O_4$ (z=⅓). Titanium dioxide ($TiO_2$, anatase) and lithium hydroxide (LiOH) were thoroughly mixed in a molar ratio of 5/3:4/3. The mixture was molded by press into a pellet and baked at 800° C. for 24 hours in helium atmosphere to obtain $Li_{4/3}Ti_{5/3}O_4$. This compound is pulverized into a powder having an average particle size of 10.5 μm.

To 90 parts by weight of $Li_{4/3}Ti_{5/3}O_4$ were added 3 parts by weight of carbon black, 4 parts by weight of graphite, and 3 parts by weight of polyvinylidene fluoride (PVDF) as binder, and the mixture was further mixed in wet process with a solvent, N-methyl-2-pyrrolidone, and an anode paste was obtained. This anode paste was uniformly applied on both sides of a aluminum foil of 0.02 mm in thickness as an anode current collector, and, after drying, it was pressed and formed by a roller press, and band-shaped anodes (1b) was prepared.

In succession, the cathode was prepared as follows. $LiMn_2O_4$ obtained in Example 1 and $LiCo_{0\times5}Ni_{0\times5}O_2$ obtained in Example 2 were mixed in a molar ratio of 8.2:1.8. A cathode (2b) was prepared in the same manner as in Example 1 with the exception of using the above mixture as a cathode active substance.

Thus prepared anode (1b) and cathode (2b) were taken up in a roll form with a porous polypropylene separator (3) placed between them, and a battery element was prepared as a roll with mean outside diameter of 15.7 mm.

The above battery element was accommodated to a battery can and a mixed solution of ethylene carbonate (EC) and dimethyl carbonate (DMC) dissolving 1 mole/liter of $LiClO_4$ was poured into the battery can as electrolyte. A battery (S) was prepared in the same manner as in Example 1 with the exception of using the above electrolyte in the outside diameter of 16.5 mm and height of 65 mm in the battery structure as shown in FIG. 1.

COMPARATIVE EXAMPLE 1

A battery (T) was prepared in the same manner as in Example 3 with the exception of using $LiMnO_4$ only as a cathode active substance.

The batteries (S) and (T) were aged at ordinary temperature for 12 hours for the purpose of stability of the battery inside, and the charging upper limit voltage was set at 3.2 V, and by charging at ordinary temperature for 8 hours and discharging at constant current of 800 mA at ordinary temperature until the terminal voltage of 2.0 V, and the initial discharge capacity of each battery was 1000 mAh, respectively.

Afterwards, each battery was presented for charging and discharging cycle test at 40° C.

The battery (S) maintained a high capacity maintenance rate exceeding 85% after 150 cycles, while the battery (T) dropped in capacity significantly along with cycles, becoming nearly half of the initial capacity in about 150 cycles.

Further, the battery (S) was high in safety which showed the maximum reached temperature of the battery surface of up to 120° C. in the overcharging test.

Thus, by preparing a battery by mixing $LiCo_{1-y}Ni_yO_2$ (where $0 \leq y \leq 1$) by 5 mole % or more to the main active substance of lithium manganese complex oxide, the added $LiCo_{1-y}Ni_yO_2$ functions also as active substance, and lithium ions are partly extracted, and in the cathode it is present in a form of $Li_xCo_{1-y}Ni_yO_2$ (where $0 < x < 1$, $0 \leq y \leq 1$).

Since $Li_xCo_{1-y}Ni_yO_2$ (where $0<x<1$, $0≦y≦1$) is a favorable ion conductor, it functions effectively as ion conduction aid, and therefore the lithium ion secondary battery small in capacity deterioration due to charging and discharging cycles is obtained.

However, the residual lithium in $Li_xCo_{1-y}Ni_yO_2$ precipitates metal lithium on the anode in overcharging, and safety in overcharging is impaired, and hence in the invention, $Li_xCo_{1-y}Ni_yO_2$ should be defined at 50 mole % or less of the cathode active substance, preferably 30 mole % or less, or more preferably 20 mole % or less, and when the molar number (a) of Mn and the sum (b) molar number of Co and Ni contained in the cathode active substance layer and the molar number (c) of active substance carbon contained in the anode active substance layer confronting the cathode satisfy the relation of $$0.12≦(a+2b)/2c≦0.17$$

the safety in overcharging is guaranteed.

As a result, the inexpensive lithium manganese complex oxide can be used as the cathode main active substance of the lithium ion secondary battery, the lithium ion secondary battery of large capacity, long life and high safety that can sufficiently replace the existing nickel cadmium secondary battery may be presented at low cost, of which industrial value is great.

What is claimed is:

1. A nonaqueous electrolyte secondary battery comprising:

a cathode;

an anode;

a separator;

a nonaqueous electrolyte;

wherein said cathode comprises a main active substance comprising a spinel lithium manganese complex oxide and wherein said cathode comprises a solid state lithium ion conductor that is mixed with the main active substance, further comprising an anode comprising an active substance comprising a carbon material capable of doping and dedoping lithium; and wherein said cathode comprises $Li_xCo_{1-y}Ni_yO_2$ (where $0<x<$, $0≦y≦1$) as a lithium ion conductor comprising 5 mole % or more and 50 mole % or less of the cathode main active substance;

and wherein a molar number a of Mn and a sum b molar number of Co and Ni contained in a cathode active substance layer, and a molar number c of active substance carbon contained in an anode active substance layer confronting the cathode are in the relation of:

$$0.12≦(a+2b)/2c≦0.17.$$

2. A nonaqueous electrolyte secondary battery as claimed in claim 1, wherein the $Li_xCo_{1-y}Ni_yO_2$ comprising 5 mole % or more and 30 mole % or less of the cathode main active substance.

3. A nonaqueous electrolyte secondary battery as claimed in claim 2, wherein the $Li_xCo_{1-y}Ni_yO_2$ comprises by 5 mole % or more and 20 mole % or less.

* * * * *